United States Patent
Declerck

(10) Patent No.: US 10,438,520 B2
(45) Date of Patent: Oct. 8, 2019

(54) LOAD LEVELING APPARATUS FOR TILED DISPLAYS AND RELATED METHODS

(71) Applicant: BARCO N.V., Kortrijk (BE)

(72) Inventor: Tom Declerck, Meulebeke (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 15/549,554

(22) PCT Filed: Feb. 10, 2016

(86) PCT No.: PCT/EP2016/052839
§ 371 (c)(1),
(2) Date: Aug. 8, 2017

(87) PCT Pub. No.: WO2016/128474
PCT Pub. Date: Aug. 18, 2016

(65) Prior Publication Data
US 2018/0033345 A1   Feb. 1, 2018

(30) Foreign Application Priority Data

Feb. 10, 2015   (GB) ................................... 1502203.1

(51) Int. Cl.
*G09F 9/302*   (2006.01)
*F16M 13/02*   (2006.01)

(52) U.S. Cl.
CPC ......... *G09F 9/3026* (2013.01); *F16M 13/022* (2013.01)

(58) Field of Classification Search
CPC .............................. G09F 9/3026; F16M 13/022
See application file for complete search history.

(56) References Cited

U.S. PATENT DOCUMENTS 4,872,632 A * 10/1989 Johnson ................ A47F 5/0892
                                                               248/332
5,900,850 A *  5/1999 Bailey ....................... G09F 9/33
                                                             340/815.83
(Continued)

FOREIGN PATENT DOCUMENTS

CN        201765772 U      3/2011
CN        102359706 A      2/2012
(Continued)

OTHER PUBLICATIONS

International Search Report (ISR) dated May 2, 2016, for PCT/EP2016/052839.

(Continued)

*Primary Examiner* — Anita M King
(74) *Attorney, Agent, or Firm* — Bacon & Thomas, PLLC

(57) ABSTRACT

An array of display tiles and a load levelling mechanism is described that can be used with the array of display tiles including at least one truss, the at least one truss having at least one first and one second suspension point, from which display tiles can be suspended, further including first and second actuators adapted to modify the vertical position of the at least one first or the at least one second suspension point in a vertical direction, in function of a force applied to the at least one first suspension point and a force applied to the at least one second suspension point.

19 Claims, 14 Drawing Sheets

(56) References Cited

U.S. PATENT DOCUMENTS

| | | | |
|---|---|---|---|
| 6,704,989 B1 * | 3/2004 | Lutz | G09F 9/30 |
| | | | 29/426.1 |
| 9,247,683 B2 * | 1/2016 | Davis | H05K 13/00 |
| 9,741,271 B2 * | 8/2017 | Tait | G09F 9/33 |
| 9,924,613 B2 * | 3/2018 | Pace | F16M 13/00 |
| 2008/0067312 A1 | 3/2008 | Allen et al. | |
| 2013/0086797 A1 | 4/2013 | Davis et al. | |
| 2014/0239139 A1 | 8/2014 | Opsomer | |

FOREIGN PATENT DOCUMENTS

| | | | |
|---|---|---|---|
| WO | 2008/036856 A2 | 3/2008 | |
| WO | WO-2015189377 A1 * | 12/2015 | G09F 9/3026 |

OTHER PUBLICATIONS

Written Opinion dated May 2, 2016, for PCT/EP2016/052839.
Chinese First Office Action in corresponding Chinese Application No. 201680006832.1, dated Apr. 23, 2019.

* cited by examiner

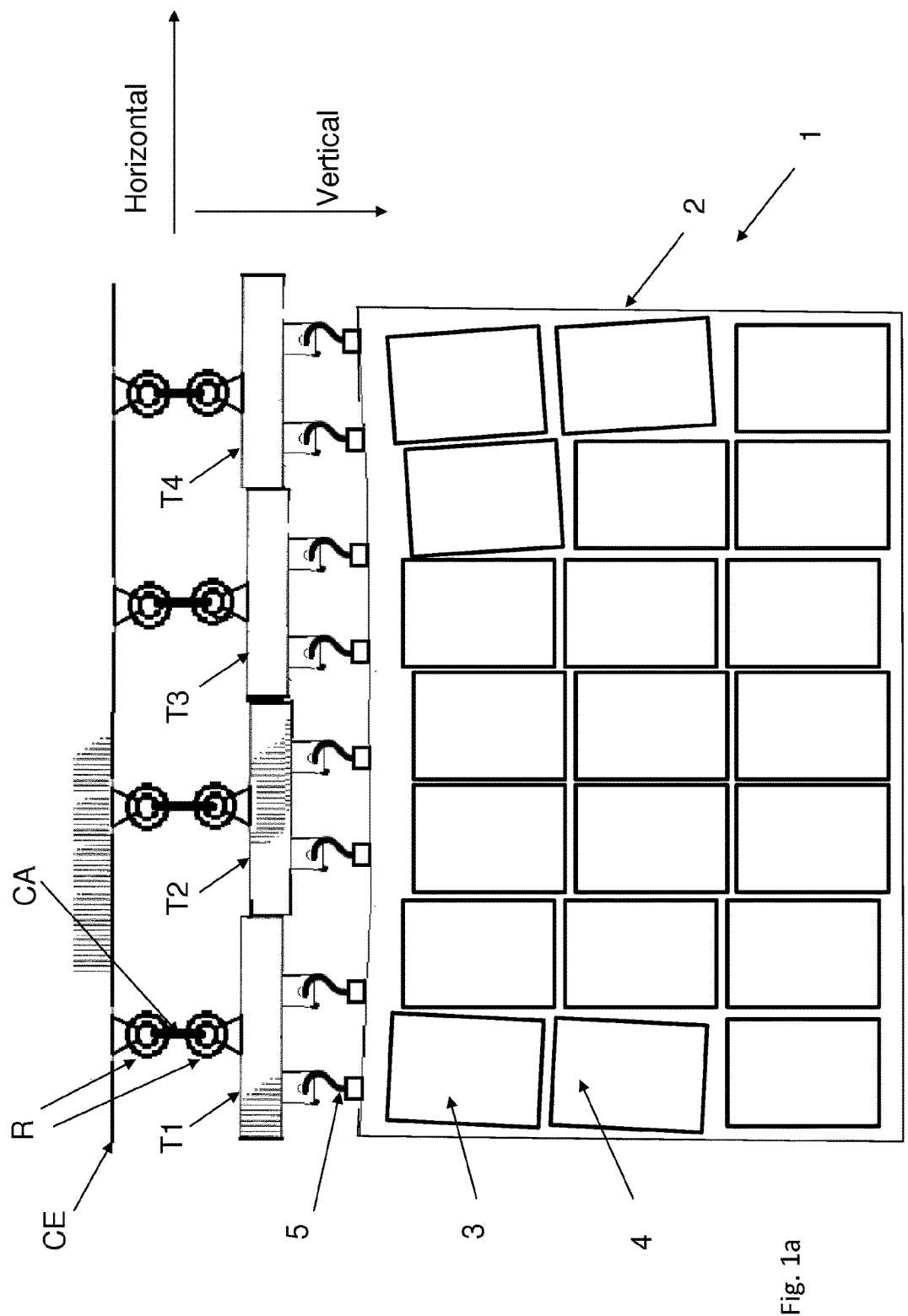

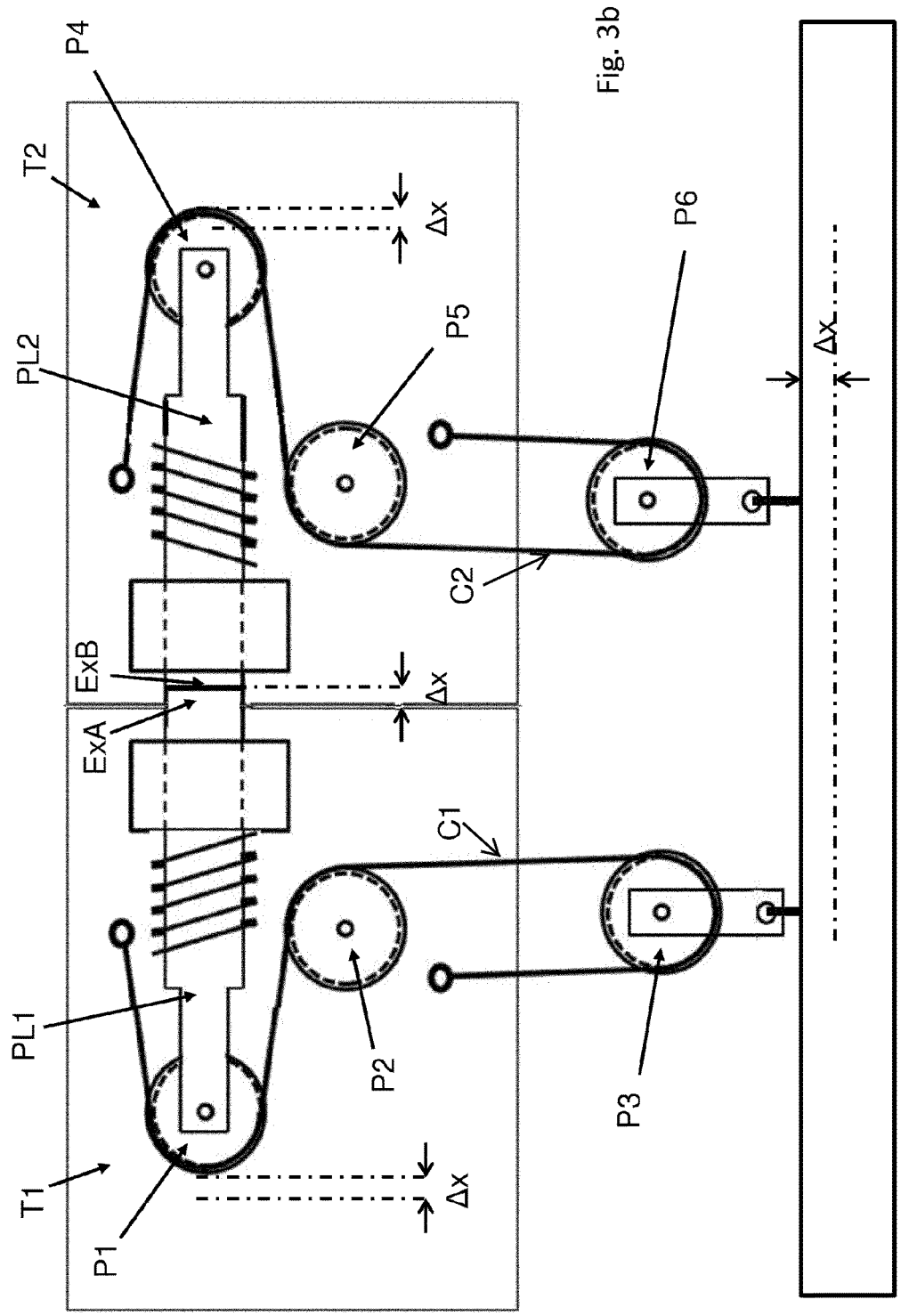

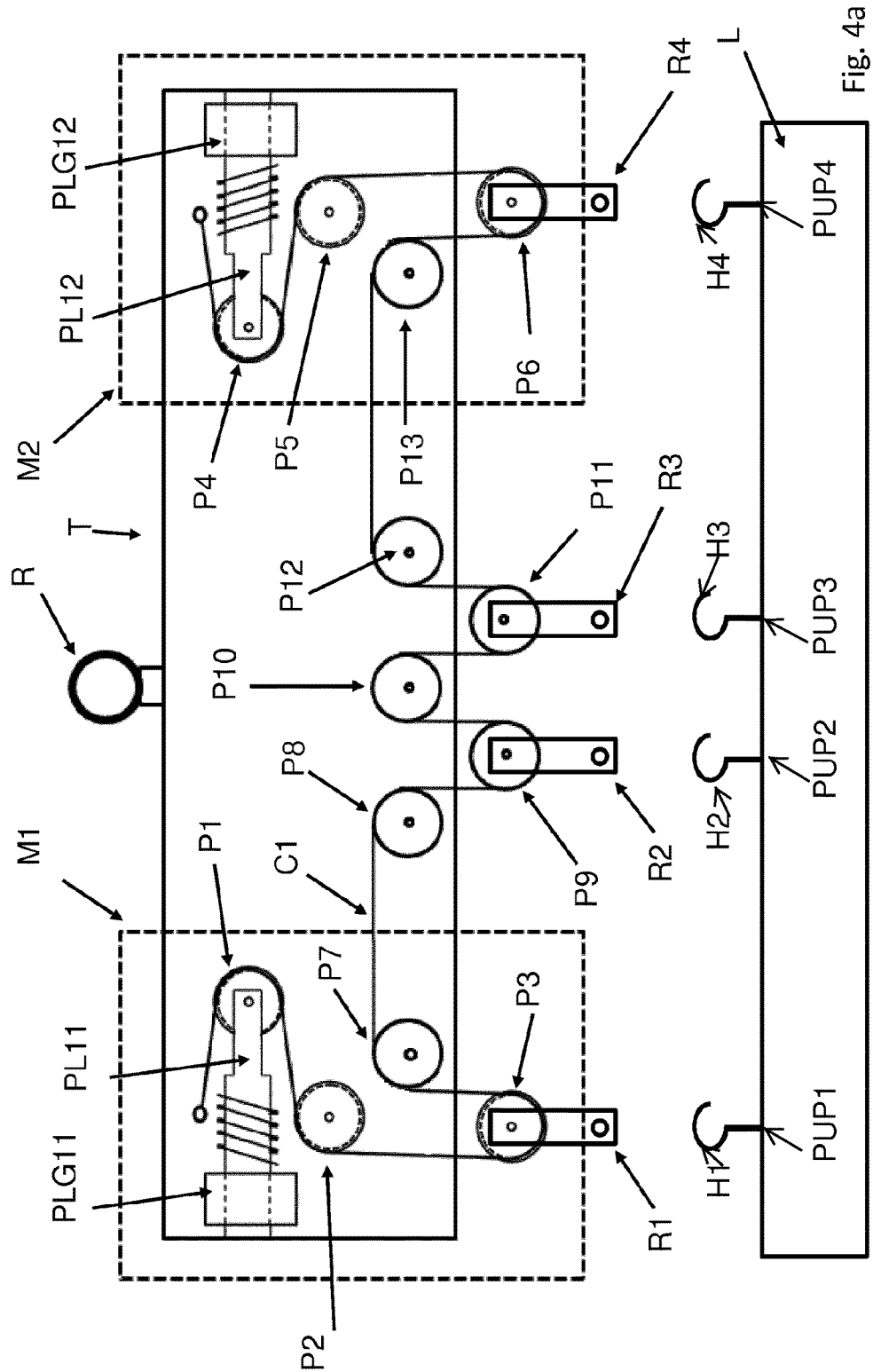

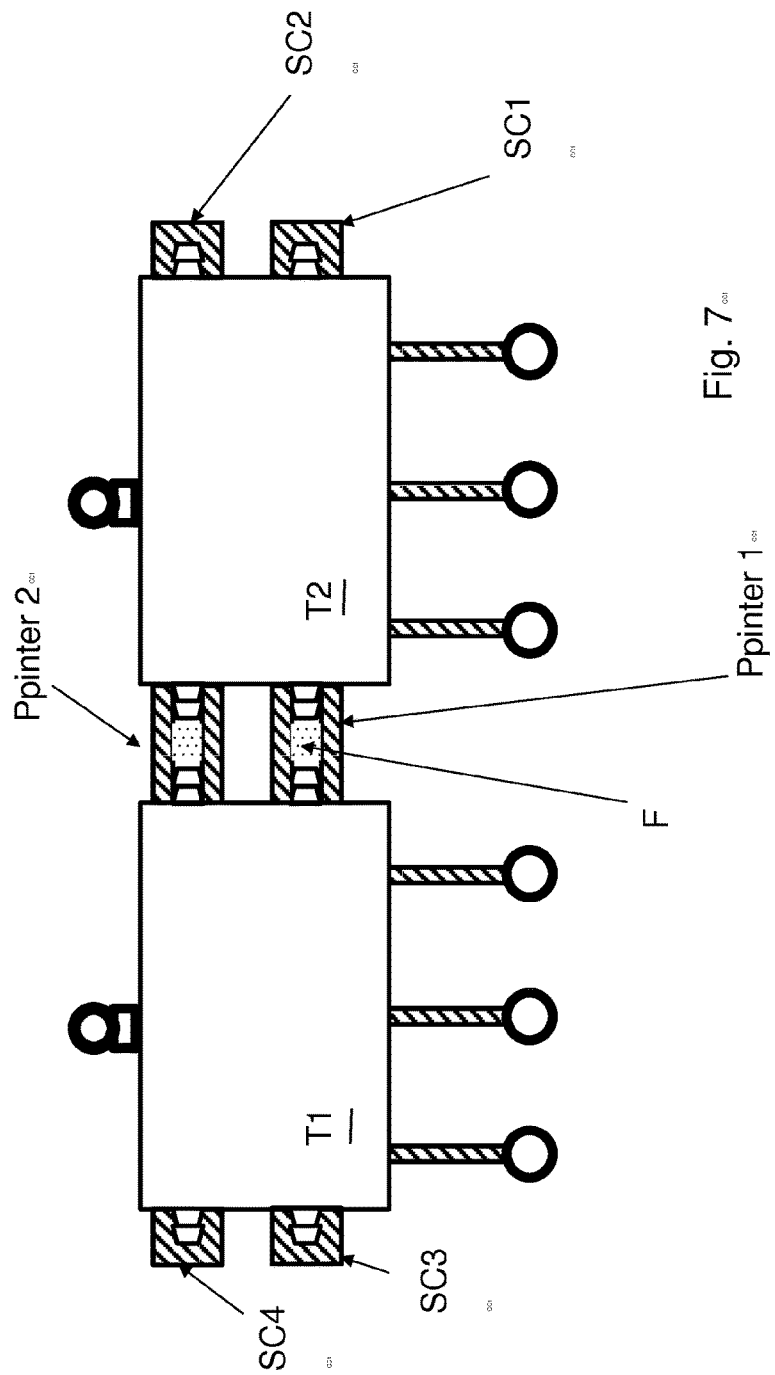

LOAD LEVELING APPARATUS FOR TILED DISPLAYS AND RELATED METHODS

The present invention relates to a suspended array of display tiles for displaying static or moving images and a load levelling mechanism and method for use with the displays.

BACKGROUND OF THE INVENTION

As seen on FIG. 1a, a tiled display 1 usually comprises tiles such as LED tiles 3, 4 arranged in a regular pattern or array and fastened to a support structure 2. The support structure 2 can be suspended by e.g. hooks 5 from a truss. The truss itself is usually composed of (similar or identical) truss elements T1, T2, T3, T4.

Tolerances will cause a misalignment of tiles. As seen in FIG. 1b, if the tiles are suspended by hooks or cables from trusses T1, . . . T4, the height of the pick-up points PUP1, PUP2 . . . PUP8 will be slightly different and/or the height of the hooks to which the tiles are to be suspended to the trusses can be different and/or the truss elements hanging from a ceiling CE are at slightly different height (because e.g. rings R and cables CA with which they are hung to the ceiling CE have slightly different lengths).

In the example of FIGS. 1a and 1b, the truss T1 being the highest will for instance be the one to experience more load. In the example of FIGS. 1a and 1b, the pick-up points PUP1 and PUP2 being the highest, the load of the tiles (3, 4) and the support structure 2 will be concentrated on the first truss element T1. In the example of FIGS. 1a and 1b, the first truss element T1 is positioned higher than the other truss elements T2 and T3. This may be caused for instance if the rings and chain with which the truss element T1 is hung to the ceiling are shorter than those with which the other truss elements are hung. In the example of FIGS. 1a and 1b, assuming that the hooks 6, 7, 8 . . . 13 have the same lengths, the difference in height of the pick-up points is equal to the difference in height Δ at which the truss elements are hung.

The other trusses, in particular T2 and T3 with the lower pick up points PUP3, PUP4, PUP5 and PUP6 will be submitted to the loads when the tolerances will have been compensated, for example by the mechanical deformations of the display tiles. This leads to stresses in the tiles and relative displacement in three dimensions of the tiles (as well as illumination devices having light emitting or transmitting pixels such as light emitting diodes (LED) on these tiles) of the display. These relative displacements cause visual artefacts that are more visible when the resolution of the display increases (i.e. the distance between consecutive LEDs or emissive or transmissive pixels in general).

SUMMARY OF THE INVENTION

A solution is required to compensate for the tolerances affecting tiled displays where tiles are suspended on trusses and fastened together to form a regular tiling. As tiles will be used to assemble tiled displays of varying dimensions, the solution is preferably modular and deployable with as little difficulties as possible.

Embodiments of the present invention are concerned with a tiled display for displaying static or moving images and comprising at least a first and a second truss, each truss having at least one suspension point from which display tiles can be suspended. A display tile for use with any of the embodiments of the present invention may include light emitting diodes (LED) or organic light emitting diodes (OLED) or other types of displays with emissive or transmissive pixels such as fixed format displays such as LCD, or plasma displays.

Embodiments of the present invention provide a load levelling mechanism which is able to compensate for differences in loads on at least two trusses or truss elements from which tiles are suspended. The load levelling mechanism can provide interaction between adjacent trusses in order to level pick-up points for display tiles and distribute the load evenly or more evenly among the trusses.

In embodiments of the present invention, in one aspect, the position of the suspension points with respect to a truss are modified in function of the force applied to said suspension point and the force applied to the suspension point of an adjacent truss.

The position of the suspension point is modified by an actuator such as a plunger or a hydraulic cylinder, in function of the force applied to the at least one suspension point of the truss and the force applied to the at least one suspension point of the other truss. To control the load levelling mechanism of the present invention one possible method to measure such a force, for example, as an input to an actuator control is to use a stress gauge based sensor e.g. constantan wire and a resistive bridge.

In embodiments of the present invention a sensing mechanism is sued to sense out-of-balance conditions and an actuator is provided to compensate at least partly for the out of balance conditions and to level the tiles and trusses.

The modification in function of the force applied to the suspension point and the force applied to the suspension point of an adjacent truss can be achieved e.g. by coupling a first actuator on or fixed to a first truss to a second actuator on or fixed to a second, adjacent truss. In particular, if the first and second actuators are in contact, they can push each other, one actuator thereby transmitting to the other actuator the force that is applied to it.

The first and second actuators interact with each other and determine which one of the force applied to the at least one suspension point of the first truss and the force applied to the at least one suspension point of the second truss is the largest.

A first actuator can be a first plunger with a first surface with which it will push on a corresponding second surface of a second actuator, e.g. a second plunger on an adjacent truss. Various mechanical actuators are included within the scope of the present invention, such as resilient actuators such as spring driven actuators or spring driven and motor assisted actuators that are responsible for moving or being moved by the tile suspension mechanism of embodiments of the present invention. For example an actuator can be powered by internal power source such as a spring or a battery or by an external power source such as an electric current, hydraulic fluid pressure, or pneumatic pressure for moving the actuator. However, a self-contained actuator such as a spring driven plunger is preferred as it does not require a separate power supply.

The position of the first actuator, e.g. plunger with respect to the first truss is determined by the force applied to the at least one suspension point of the first truss, the force applied to the first actuator, e.g. plunger by a resilient element such as a spring and the force applied to the first actuator e.g. the first plunger by a second actuator, e.g. a second plunger of an adjacent second truss.

The load supported by a truss is determined by the position of the at least one suspension point with respect to the truss in function of the position of the actuator, e.g. plunger.

The present invention in another aspect provides a mechanism that can be used with a tiled display comprising at least one truss, the at least one truss having at least one first and one second suspension point, from which display tiles can be suspended, further comprising first and second actuators adapted to modify the vertical position of the at least one first or the at least one second suspension point in a vertical direction, in function of a force applied to the at least one first suspension point and a force applied to the at least one second suspension point.

The present invention also provides a method of load levelling of a tiled display comprising at least one truss, the at least one truss having at least one first and one second suspension point from which display tiles can be suspended,
wherein the at least one truss has first and second actuators, the method comprising:
modifying the position of the at least first or the at least second suspension point in function of a force applied to the at least first suspension point and a force applied to the at least second suspension point.

The present invention also provides a method of load levelling of a tiled display comprising at least a first and a second truss, each truss having at least one first or second suspension point, respectively from which display tiles can be suspended,
wherein the first and second trusses have first and second actuators, respectively, the method comprising:
modifying the position of at least one first or second suspension point relative to each of said first and second trusses, respectively in function of a force applied to the at least one first suspension point of the first truss and a force applied to the at least one second suspension point of the second truss.

BRIEF DESCRIPTION OF THE DRAWINGS

These and other features and advantages of embodiments of the present invention will now be described in more detail with reference to the accompanying drawings, in which:

FIGS. 1a and 1b schematically illustrate an exemplary tiled display where tiles are suspended from trusses to which embodiments of the present invention can be applied;

FIGS. 3a and 3b schematically illustrate how two load levelling mechanisms represented on FIG. 2 can be used to distribute loads along a truss and keep the truss level according to an embodiment of the present invention;

FIG. 4a schematically illustrates a load levelling mechanism according to an embodiment of the present invention, adapted to interact with tiles on both sides;

FIG. 7 schematically illustrates a load levelling mechanism for a truss according to another embodiment of the present invention.

DETAILED DESCRIPTION OF THE INVENTION

Figure 1B:
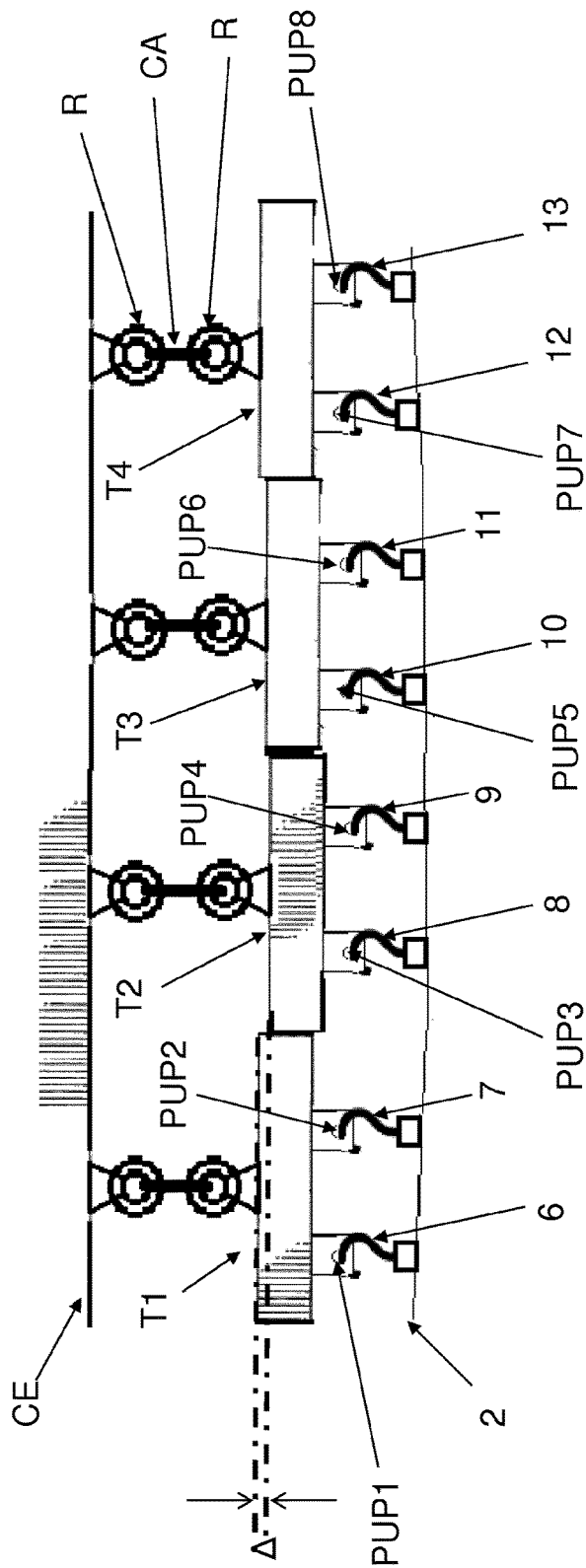

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means. The present invention relates to a load levelling mechanism to compensate for tolerances affecting tiled displays where tiles are suspended on trusses and fastened together to form a regular tiling. The mechanism is modular and scalable and can be used for assembling display tiles varying dimensions.

The tiled display used in embodiments of the present invention are for displaying static or moving images and comprise at least a first and a second truss, or first and second truss elements, each truss or truss element having at least one suspension point from which display tiles can be suspended. A display tile for use with any of the embodiments of the present invention may include light emitting diodes (LED) or organic light emitting diodes (OLED) or other types of displays with emissive or transmissive pixels such as fixed format displays such as LCD, or plasma displays.

Figure 2A:
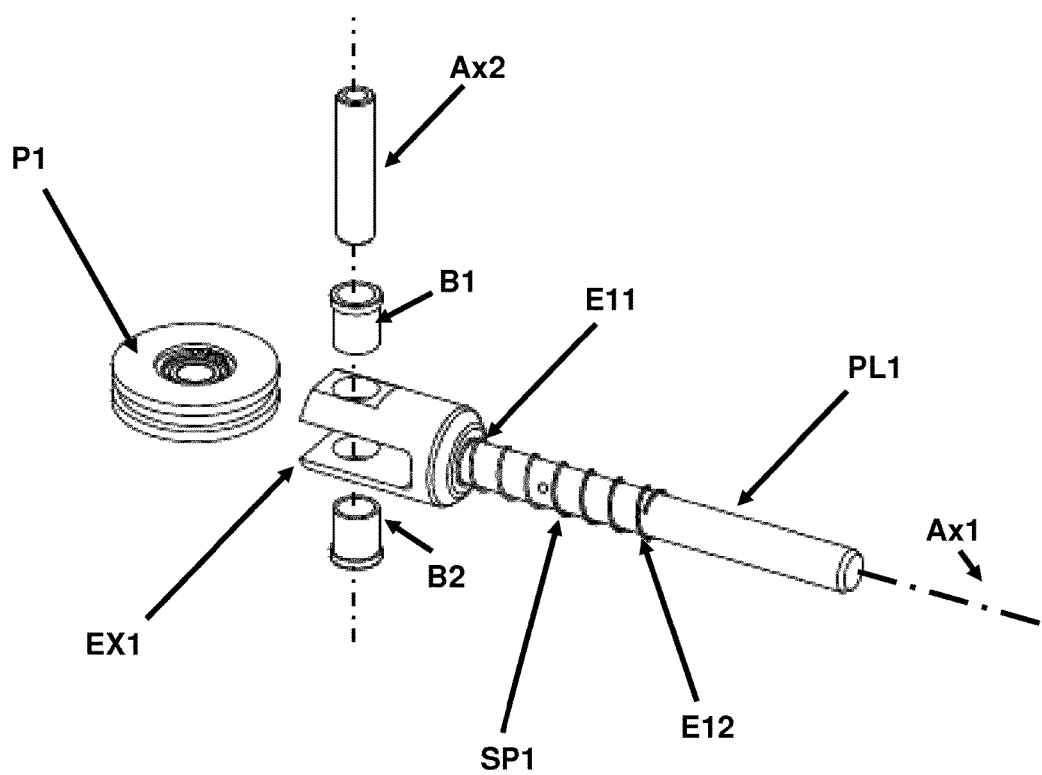
FIGS. 2a and 2b show a sub-assembly of a load levelling mechanism according to an embodiment of the present invention.
Figure 2B:
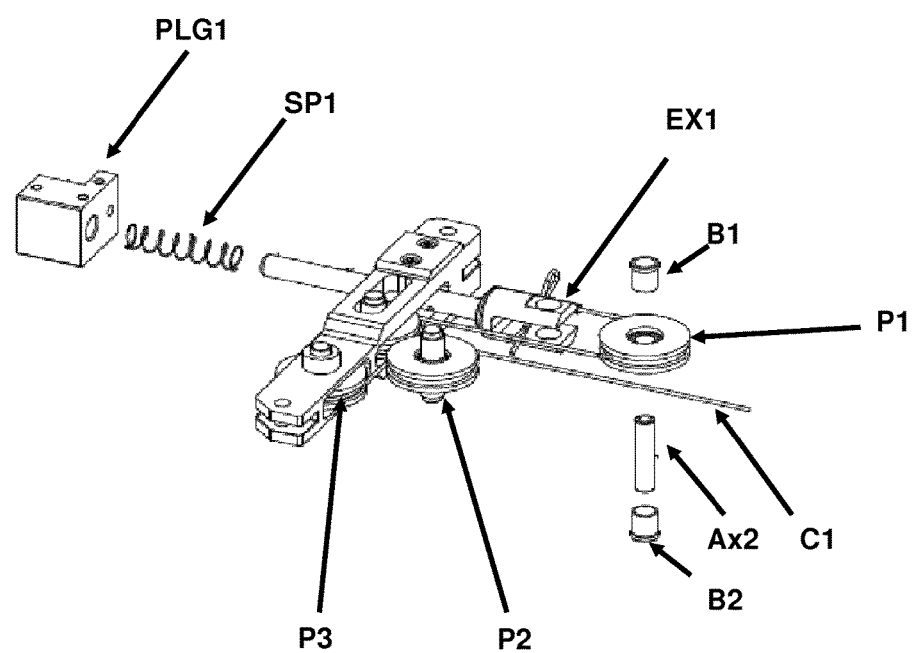
Figure 2C:
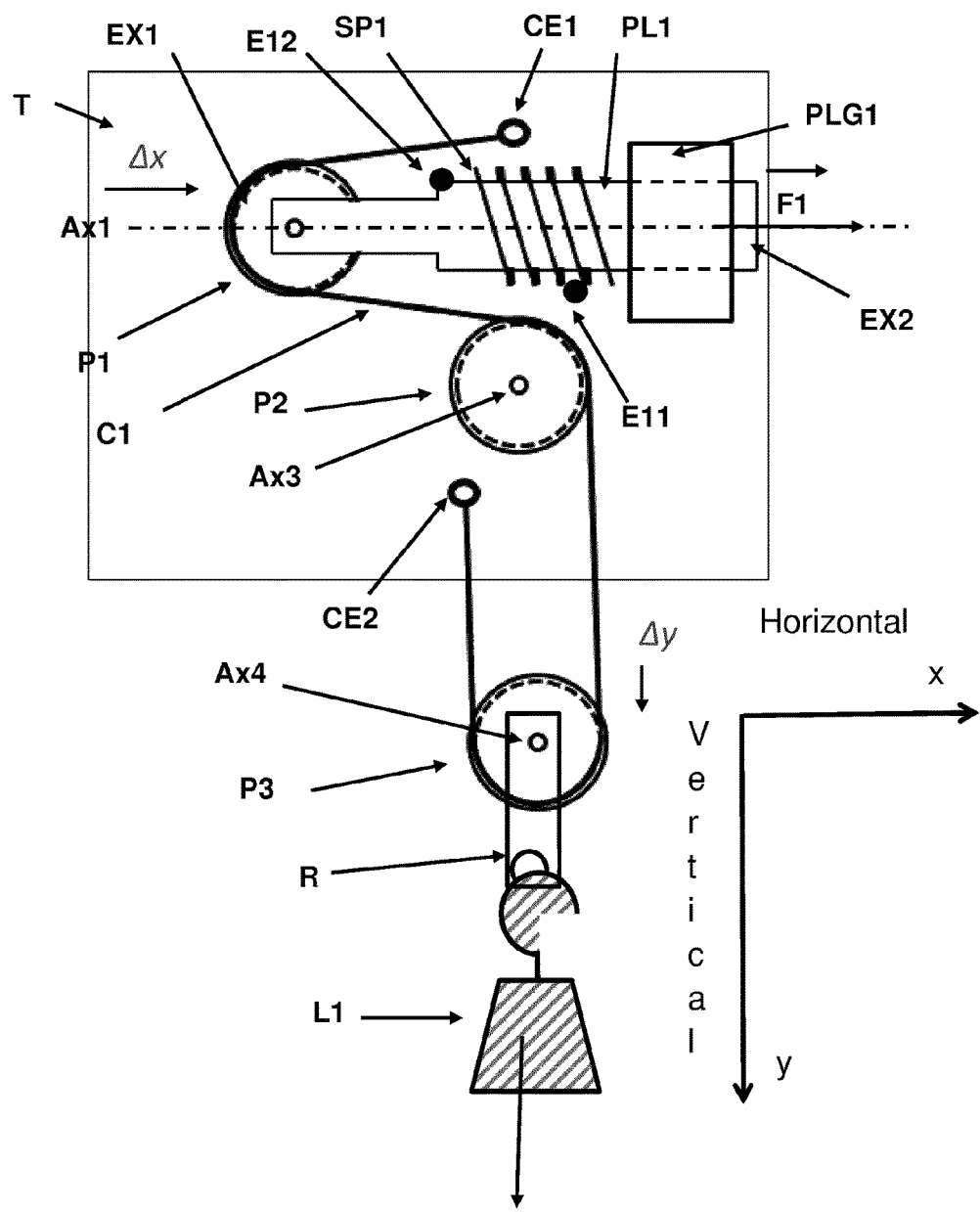
FIG. 2c schematically illustrates a load levelling mechanism for a truss according to an embodiment of the present invention.

In particular, referring to FIG. 2c, when a truss T hangs from a support point, e.g. is fastened to a ceiling in e.g. in a hall, loads caused by suspended tiles are applied vertically and a first pulley P1 can move in the horizontal direction along axis Ax1. In FIGS. 1a and 1b, and generally for all of the FIGS. 2 to 7, the length of the truss extends in the horizontal direction and the weight of the tiles pulls the truss in a direction perpendicular to the horizontal i.e. the loads applied to the trusses have a vertical direction (that is parallel to the local acceleration of gravity).

An aspect of embodiments of the present invention is a load levelling mechanism that will provide sensing interaction between adjacent trusses in order to level the pick-up points and distribute the load evenly or more evenly among the trusses.

As illustrated in FIG. 2a, FIG. 2b and FIG. 2c, a first pulley P1 is fastened to a first extremity EX1 of a first actuator, e.g. plunger PL1. The first actuator, e.g. first plunger PL1 may for instance be cylindrical or rod-shaped. FIG. 2b shows an alternative view of the actuator, e.g. plunger PL1, the pulley P1 and an axle Ax2 around which the pulley P1 can rotate. Axle Ax2 can also be shaft (not shown) which allows the shaft and pulley P1 to rotate in bearings B1 and B2 in the first extremity EX1.

A first resilient member, e.g. spring SP1 is associated/connected with the actuator, e.g. plunger PL1. One extremity E11 (best shown in FIG. 2c) of the resilient member, e.g. spring SP1 is fastened to the truss T, while a second extremity E12 of the resilient member, e.g. spring SP1 is fastened to the actuator, e.g. plunger PL1 so that a displacement of the actuator, e.g. plunger PL1 will be accompanied by a displacement of the second extremity E12 of the resilient member, e.g. spring SP1, thereby changing the length of the resilient member, e.g. spring SP1. The resilient member, e.g. spring SP1 can for instance be a coil spring with a diameter superior to the diameter of a cylindrical actuator such as a plunger PL1. In an alternative embodiment, the resilient member, e.g. spring SP1 is not fastened to the truss and/or the actuator e.g. plunger PL1 but is pressing against a first surface fixed with respect to the truss (like e.g. a surface of a plunger guide PLG1) and against a second surface of the plunger PL1.

In any of the above embodiments, when the length of the resilient member, e.g. spring SP1 is changed, the resilient member is acting as a sensor whereby its change of length is related to the sensed load. However, a force will be exerted by the resilient member, e.g. spring SP1 on the first actuator, e.g. plunger PL1 in a direction opposite to that of the displacement of the first actuator, e.g. plunger PL1. Hence the resilient member also acts as a drive for the actuator.

The displacements of the first pulley P1 and first actuator, e.g. plunger PL1 are restricted to the horizontal direction, i.e. along or parallel to the axis Ax1. This can be for instance done by means of an actuator guide such as a plunger guide PLG1 fastened to a second extremity EX2 of the first actuator PL1. The actuator guide such as the plunger guide PLG1 restricts the movement of the actuator, e.g. plunger PL1 to a single degree of freedom. In the example of FIGS. 2a and 2b, the actuator, e.g. plunger PL1 can translate along the axis Ax1. The perspective view of FIG. 2b shows the actuator, e.g. plunger PL1, first, second and third pulleys P1, P2 and P3, a cable C1, the resilient member, e.g. spring SP1 and the actuator guide, e.g. plunger guide PLG1.

Referring to FIG. 2c the cable C1 has first and second extremities CE1 and CE2. The first extremity CE1 is fastened to the truss T. The cable C1 loops around the first pulley P1 and around a second and a third pulley P2 and P3. The second pulley P2 is fastened to the truss T by means of e.g. a (rotation) journaled axle Ax3 or a shaft. The position of the center of the pulley P2 with respect to the truss is fixed. P2 is optional, the cable C1 could hang vertically from the pulley P1 although this is less preferred.

The freely hanging third pulley P3 receives a load L1 e.g. by means of a hook or ring R e.g. one or more display tiles.

The load L1 is the force applied to the ring R when the tiles are suspended on the rings. The load applied to a particular ring is not necessarily the weight of the tiles and their frame divided by the number of rings. An asymmetric example is shown in FIG. 2c where the load L1 is the entire weight of the tiles and their frame while ideally, had there been no differences in the height of the pick-up points, L1 would have been a fraction of the weight of the tiles and their frame.

The second extremity CE2 of the cable C1 is fastened to the truss T. In normal use, the height of the second extremity CE2 is higher than the center Ax4 of the third pulley P3.

When a load L1 is applied to the third pulley P3, a force F1 is applied to the first pulley P1. The direction of the force F1 is parallel to the horizontal direction along the direction Ax1 and its magnitude is a fraction of the load L1. In the mechanism as illustrated in FIG. 2c, the magnitude of F1 is half the magnitude of the load L1.

Under the action of the force F1, the first pulley P1 and the first actuator, e.g. first plunger PL1 move and as an end of the first resilient member, e.g. first spring SP1 is fixed at a position of the second extremity E12 to the actuator, e.g. plunger PL1, the first resilient member, e.g. spring SP1 is compressed. The magnitude Δx of the displacement of the first pulley and the first actuator, e.g. first plunger is, using Hooke's law, in a first approximation, proportional to the magnitude of the force F1:

$$\Delta x = F1/k$$

where k is the spring constant of the first resilient member, e.g. spring SP1.

As the first actuator, e.g. first plunger PL1 and first pulley P1 move along the horizontal direction, the third pulley P3 moves in a vertical direction. The movement in the horizontal direction of the actuator, e.g. first plunger PL1 is intended to transfer a force to an adjacent truss. For the mechanism of FIG. 2c the magnitude Δy of the displacement of the third pulley P3 is equal to Δx. In a more general case, the magnitude of the displacement of the third pulley P3 will be proportional to the magnitude of the displacement Δx of the first pulley P1 and first resilient member, e.g. first spring SP1 whereby the movement of the actuator, e.g. plunger PL1 to the right in FIG. 2c will result in pulley P3 moving downwards. Thus a movement of the actuator, e.g. first plunger PL1 in the horizontal direction to the right will exert a force on an adjacent actuator, e.g. a plunger of an adjacent truss, while pulley P3 moves down. The opposite occurs when a force is applied to the first actuator, e.g. first plunger PL1 from an actuator of an adjacent truss in a direction to the left as this will cause the pulley P3 to rise. In the example of FIG. 2c, the load L1 pulls the ring R and pulley P3 downwards. Since the extremities, CE1 and CE2 of the cable C1 are both fastened to the truss and since the cable C1 is under tension, it transmits the force to the pulley P1 which is pushed to the right. The pulley P1 being fastened to the first actuator, e.g. the first plunger PL1, the first actuator, e.g. the first plunger is moved to the right.

Figure 3A:
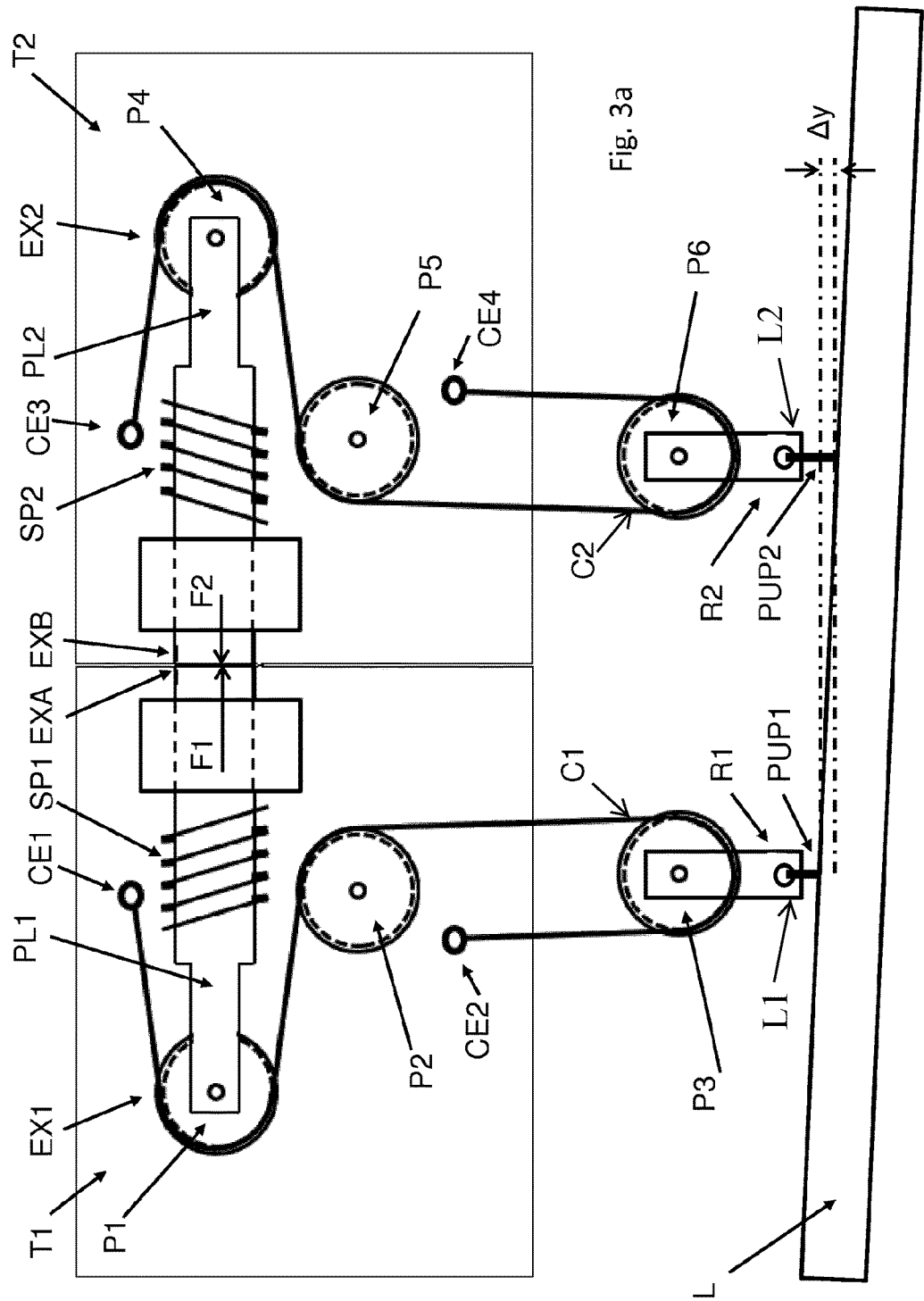

FIGS. 3a and 3b show how two of the load levelling mechanisms illustrated in FIG. 2 (e.g. PLG1, PL1, SP1, P3, C1) can be used to distribute loads along a truss T and to keep the truss level or more level.

As illustrated in FIG. 3a, a truss T is composed of the truss elements T1 and T2 and pulleys P4, P5 and P6 are the pulleys of truss element T2 that are equivalent to pulleys P1, P2, and P3, respectively of tile T1. A load L is suspended from pulley P3 of truss T1 by means of e.g. a ring R1 and a pulley P6 of truss T2 by mean of e.g. a ring R2. Because of tolerances (e.g. ring R2 is slightly larger than ring R1), the pick-up point PUP1 is higher than pick-up point PUP2. In the configuration of FIG. 3a, the load L is unequally distributed between truss element T1 and truss element T2. The force applied to pulley P3 is higher than the force applied to pulley P6. This higher force is transmitted by cable C1 to pulley P1. As a result, the actuator, e.g. the plunger PL1 will move to the right and pulley P3 will be lowered. The first actuator, e.g. the first plunger PL1 of truss element T1 will exert a net force against the second actuator, e.g. the second plunger PL2 of the truss element T2. The second actuator, e.g. second plunger PL2 and the associated pulley P4 move to the right. As a result, the pulley P6 is raised. Equilibrium is reached when the load L is spread evenly between the two cables C1 and C2 as shown in FIG. 3b.

The load levelling mechanism and in particular the first and second actuators, e.g. the first and second plungers PL1 and PL2 can be seen as actuators and sensors that control the position of the pulleys P3 and P6 on adjacent trusses: the first actuator, e.g. the first plunger PL1 influences the position of the second actuator, e.g. the second plunger PL2 and therefore the position of pulley P6 with respect to truss element T2; the second actuator, e.g. the second plunger PL2 influences the position of the first actuator, e.g. the first plunger PL1 and therefore the position of pulley P3 with respect to truss element T1.

The position of an actuator, e.g. a plunger can also be interpreted as a measure of the difference in load that would exist if nothing were changed, i.e. if pulley P3 was not lowered and pulley P6 not raised, for example. The load levelling mechanism can therefore be seen as a system comprising, in the example of FIGS. 3a and 3b, at least two actuators and at least two sensors, the system comparing the output of the two sensors and controlling the actuators in consequence.

We will refer to the components of the second load levelling mechanism of an embodiment of the present invention, as follows: second actuator, e.g. plunger PL2, second resilient member, e.g. spring SP2, first and second extremity EXA and EXB of the second actuator, e.g. plunger PL2, second cable C2, first pulley P4, second pulley P5 and third pulley P6.

The second load levelling mechanism is the mirror image of the first load levelling mechanism of FIG. 2 but is otherwise identical to the first load levelling mechanism. Both load levelling mechanisms are in the plane of the figures (i.e. the axes of the first and the second plungers PL1 and PL2 are aligned and there is for instance no angle between the axes of the first and the second plungers). The second extremities EXA and EXB of the first and second actuators, e.g. first and second plungers are in contact i.e. the first and second actuators, e.g. first and second plungers can interact and push each other along the horizontal direction.

Let us assume for an instant that the Load L is distributed in such a way that a load L1 is applied to the third pulley P3 of the first load levelling mechanism and load L2 is applied to the third pulley P6 of the second load levelling mechanism, L1 having an magnitude larger than L2, because e.g. the pick-up point of a first tile hung on P3 is higher that the pick-up point of a second tile hung on P6 with, for the sake of argument, L1+L2=L4.

With L1>L2 and all other things being kept equal, the force F1 applied to the first actuator, e.g. first plunger PL1 is larger than the force F2 applied to the second actuator, e.g. second plunger and the first actuator, e.g. first plunger PL1 pushes on the second actuator, e.g. second plunger. The displacement of both actuators, e.g. plungers will be to the right on the example of FIGS. 3a and 3b, that is in the opposite direction as would be the case if the first actuator, e.g. first plunger were not pushing on the second actuator, e.g. second plunger. As a result, the second load L2 will rise while the first load L1 will drop thereby leveling the pick-up points and distributing the loads equally among the trusses.

Since a truss element like T1 or T2 must be able to interact with adjacent truss elements on both sides, an actuator, e.g. a plunger is usually required at both extremities of the truss.

FIG. 4a shows a schematic representation of a truss T with actuators, e.g. plungers PL11, PL12 at both ends, allowing the truss T to interact with trusses on either or both sides of it.

A ring R allows fastening of the truss element T to a support point e.g. a ceiling.

There can be two or more pick-up points PUP1, PUP2, PUP3, PUP4 for a load L corresponding to a load on the pulleys P3, P6, P9, P11, etc. (if attached to the load), these pulleys being able to move in the vertical direction with respect to the truss T. Pulleys and pick-up points are linked by e.g. hooks H1, H2, H3, H4 that can be inserted in e.g. rings R1, R2, R3, R4 associated with pulleys P3, P9, P11 and P6. The pulleys P1 and P4 situated at opposite ends of the truss can move along the horizontal directions with respect to the truss T.

The cable C1 snakes through pulleys P1, P2, P3, P7, P8, P9, P10, P11, P12, P13, P6, P5 and P4 in order to exert a force on the pulleys P1 and P4.

The load levelling mechanisms at both ends of the truss T operate as has been described for the load levelling mechanism illustrated in FIG. 2. In this embodiment, two actuators, e.g. plungers PL11 and PL12, having plunger guides PLG11, PLG12, can interact with truss elements identical to truss element T on the right and on the left of truss element T, M1 and M2, respectively.

Figure 4B:
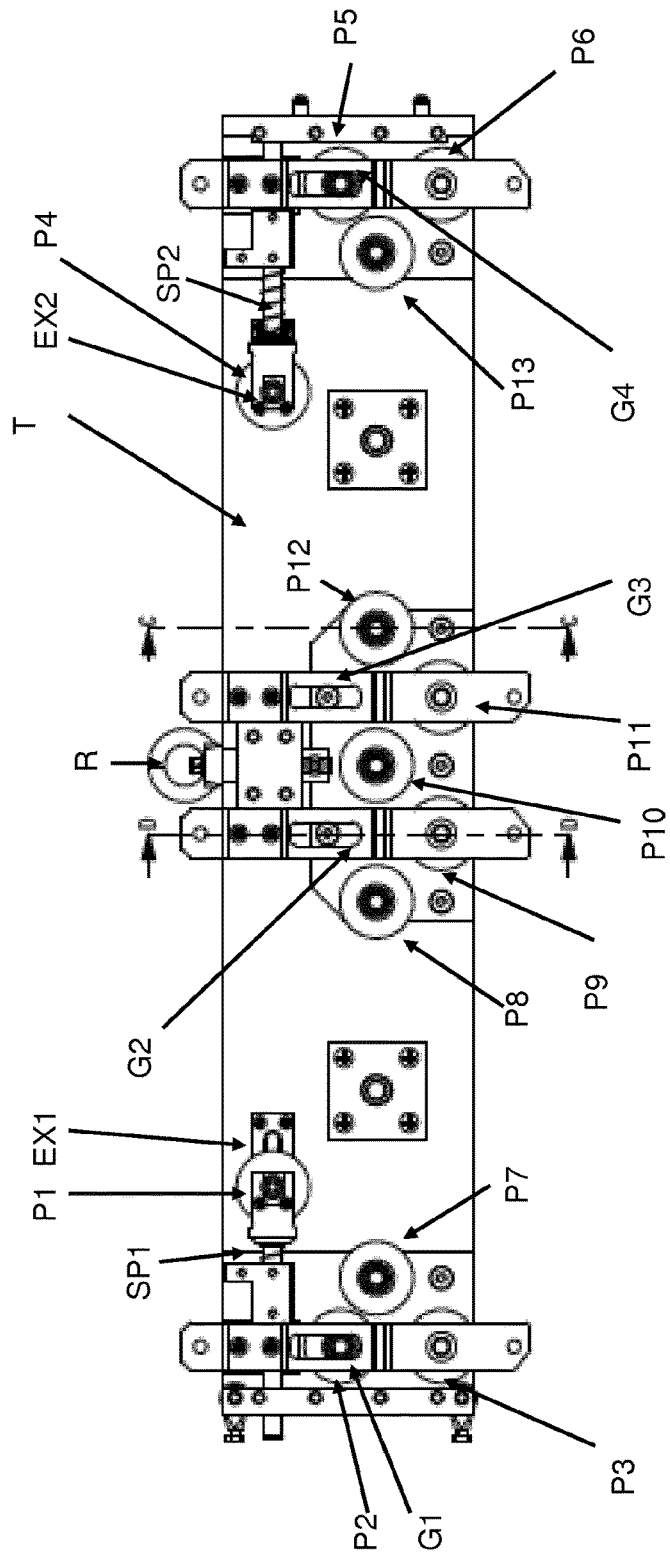
FIGS. 4b to 4e show an implementation of the load levelling mechanism of FIG. 4A, according to an embodiment of the present invention.

FIG. 4b shows a schematic view of a practical implementation of truss element T according to an embodiment of the present invention.

The main difference with the schematic representation of FIG. 4a is the presence of guides G1, G2, G3 and G4 restricting the movement of pulleys P3, P9, P11 and P6 to the vertical direction. Cable C1 is not shown to increase clarity of the figure.

Figure 4C:
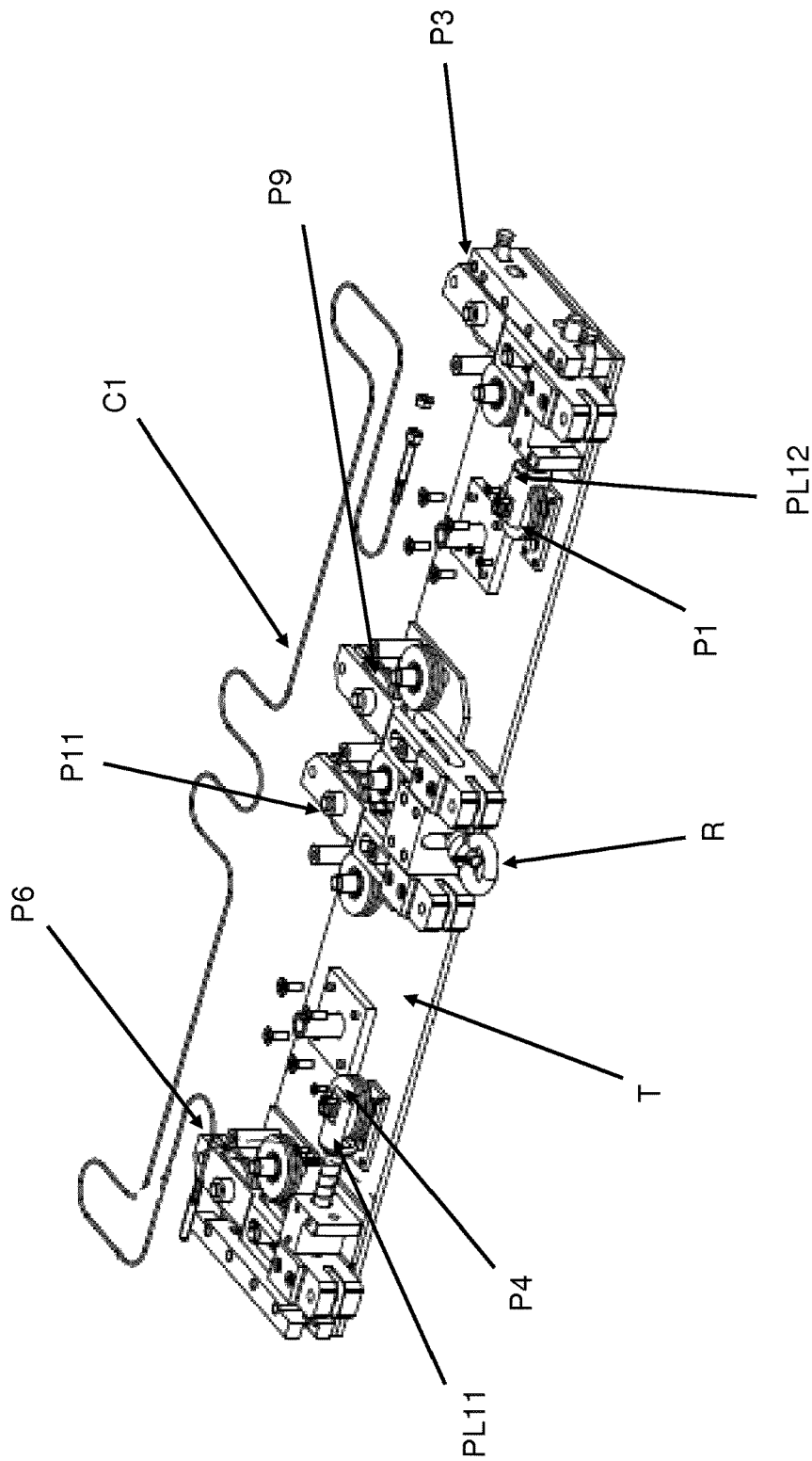

FIG. 4c shows a perspective view of a truss element according to an embodiment of the present invention. In this perspective view the cable C1 is shown but not positioned in its correct position.

Figure 4D:
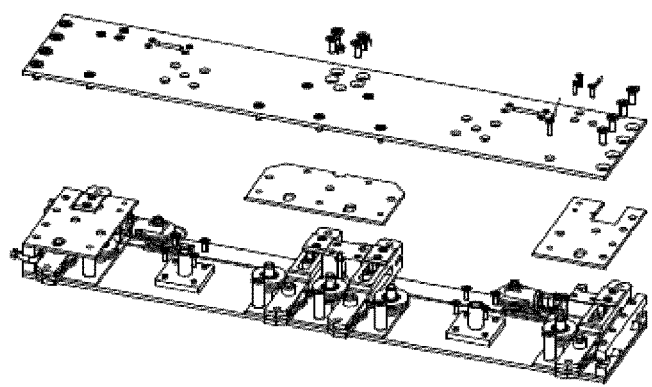
Figure 4E:
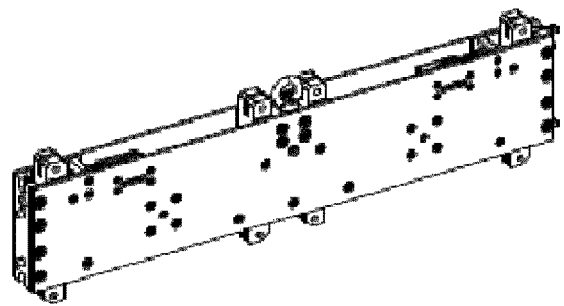

FIGS. 4d and 4e show a partially exploded view of a truss element with a cover to protect.

Figure 5:
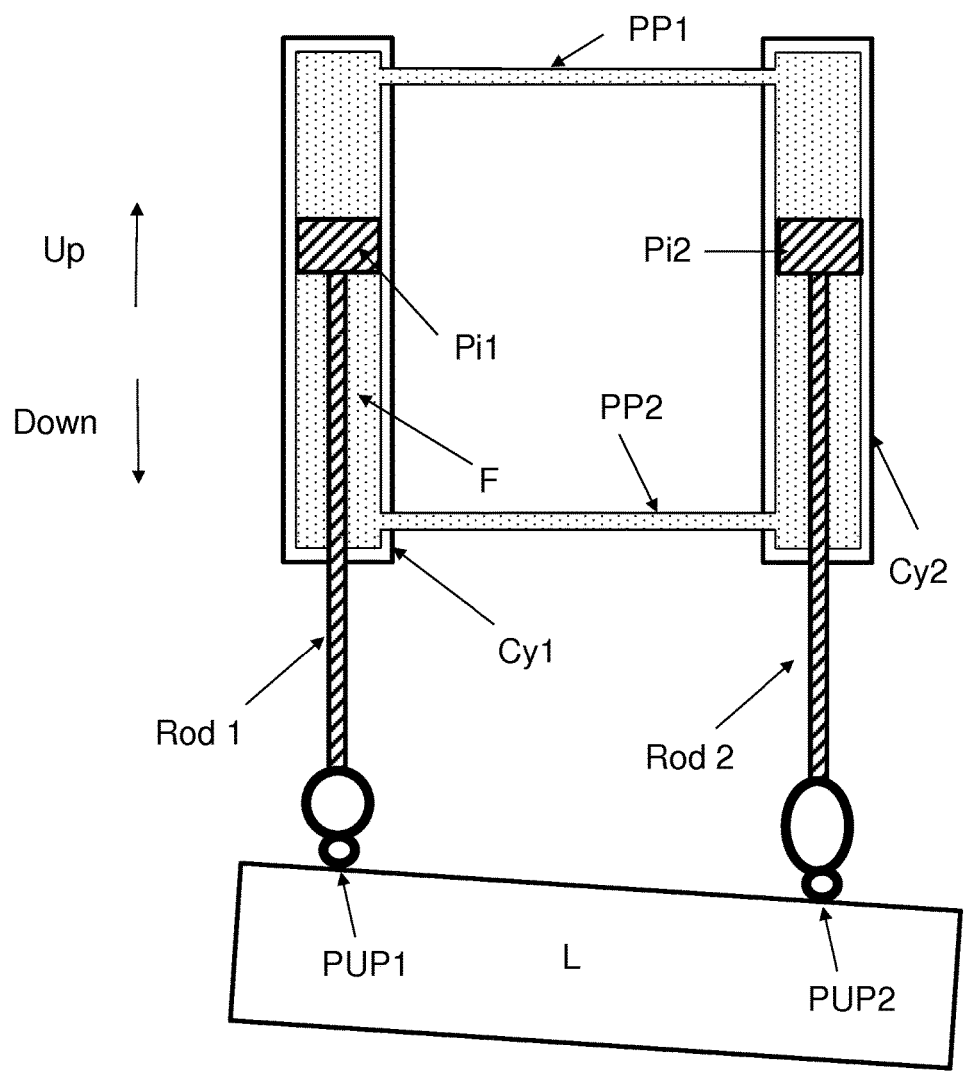
FIG. 5 schematically illustrates another load levelling mechanism for a truss according to an embodiment of the present invention.

As illustrated in FIG. 5, an alternative embodiment of the load leveling mechanism is shown. For the sake of simplicity, we first describe it for 2 pick-up points PUP1 and PUP2 as was done for FIG. 2.

A first cylinder Cy1 contains a fluid F such as e.g. transmission fluid, mineral oil etc. . . . A piston Pi1 fits in cylinder Cy1 and can move up and down.

A second cylinder Cy2 contains a fluid such as fluid F. A piston Pi2 fits in cylinder 2 and can move up and down.

As seen in FIG. 5, the fluid F is found on both sides of the pistons. The two pistons can function as a dash pot.

Each piston is fitted with a rod: Rod 1 is fastened to piston Pi1 and Rod2 is fastened to piston Pi2.

A pipe PP1 connects the upper part of cylinder Cy1 to the upper part of cylinder Cy2. A pipe PP2 connects the lower part of cylinder Cy2 to the lower part of cylinder Cy1.

Let us assume that a Load L is suspended by means of e.g. hook and rings to the rod Rod1 and Rod2 as seen of FIG. 5. Let us assume that the pick-up point PUP1 is higher than pick-up point PUP2 and that, as a result, the force applied to Rod1 is higher than the force applied to Rod2.

The piston Pi1 is pulled lower in the cylinder Cy1. As it moves down, the piston Pi1 pushes fluid through pipe PP2 from the lower part of the first cylinder Cy1 into the lower part of cylinder Cy2 and forces fluid into the lower part of cylinder 2. As a result, piston Pi2 is pushed higher up the cylinder Cy2 and the pick-up point PUP2 is raised. In this embodiment the fluid is acting as the sensor which is sensing pressure. The drive for the actuator is provided by the load L.

At the same time that piston Pi1 forces fluid through pipe PP2, it sucks fluid from the upper part of cylinder Cy2 through the pipe PP1 (this also helps piston Pi2 to move up the cylinder Cy2).

A load L is suspended by means of e.g. cables (not shown) CA and CB respectively to rod Rod1 and Rod2 (not shown). If there is some slack in cable CB, the load is drawing on cable CA only and piston Pi1 is lowered. The movement of piston Pi1 stops when the load is balanced.

FIG. 5 therefore shows a mechanism that can be used with a tiled display comprising at least one truss, the at least one truss having at least one first and one second suspension point PUP1 and PUP2, from which display tiles can be suspended, further comprising first and second actuators Pi1 and Pi2, adapted to modify the vertical position of the at least one first or the at least one second suspension point in a vertical direction, in function of a force applied to the at least one first suspension point and a force applied to the at least one second suspension point.

In another embodiment (not shown), a first actuator like e.g. a first electrical motor can modify the length of cable CA. A first sensor measures the stress in cable CA. A microprocessor controls rotation of the first motor and digitizes the output of the stress sensor. A second actuator like e.g. a second electrical motor can modify the length of a second cable. A second sensor measures the stress in the second cable. A microprocessor controls rotation of the second motor and digitizes the output of the stress sensor. Both microprocessors exchange information and compare the stresses in cables CA and the second cable. Both microprocessors control the first and second electrical motors until the stresses are equal.

Figure 6:
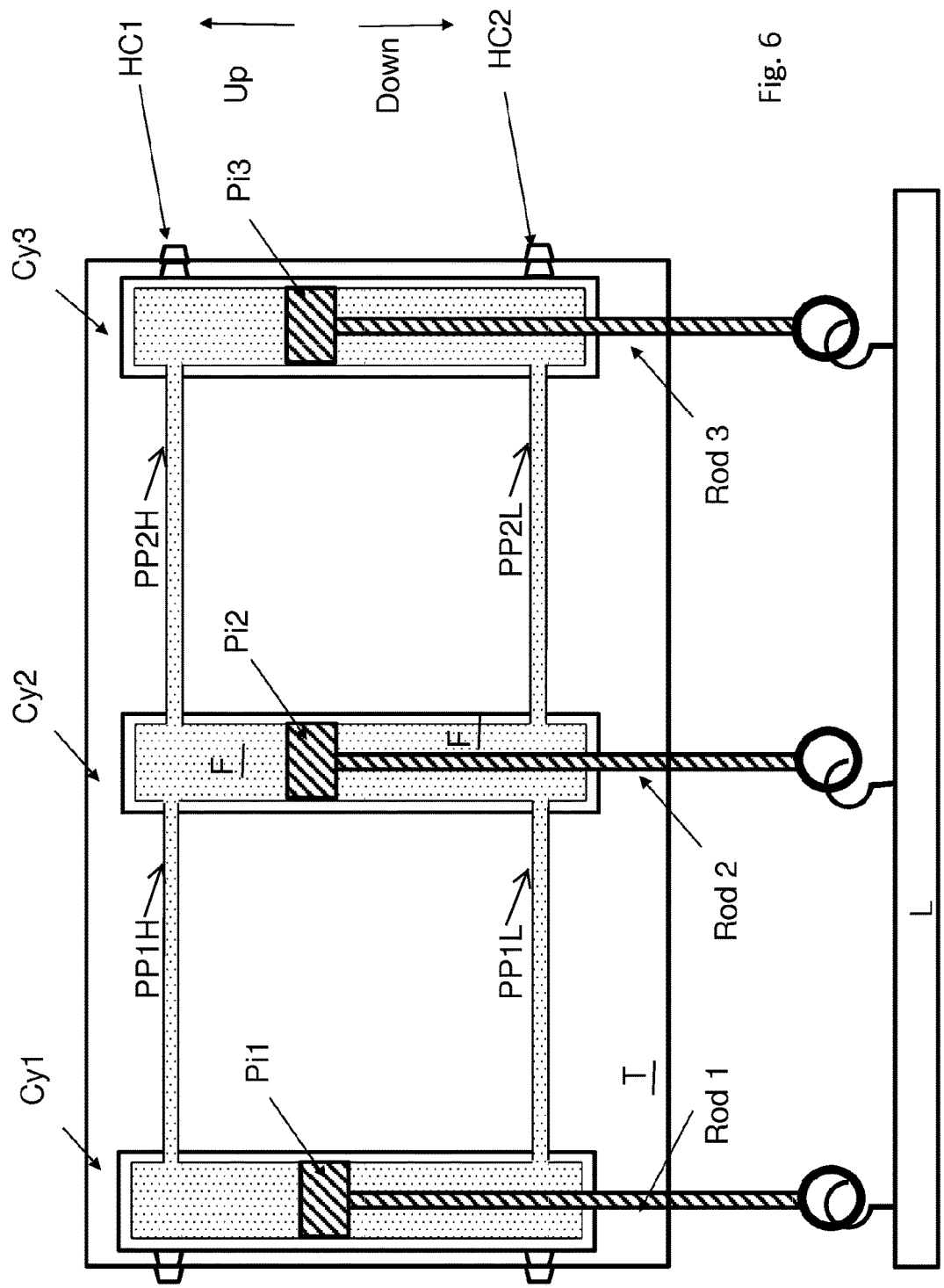
FIG. 6 schematically illustrates another load levelling mechanism for a truss according to an embodiment of the present invention.

FIG. 6 shows a schematic representation of a truss element T with a hydraulic load levelling system based on the principles described with reference to FIG. 5.

The truss element of FIG. 6 has three cylinders Cy1, Cy2, Cy3. Each cylinder has a piston (Pi1, Pi2, Pi3) and a rod (Rod1, Rod2, Rod3) fastened to the piston. The cylinders are filled with a fluid F on both sides of the pistons. The end of each rod outside of the cylinders has a fastening mean like e.g. a ring to which e.g. a hook can be hung to support a load L.

The cylinders are linked two by two pipes. Pipe PP1H allows transfer of fluid F from the upper part of cylinder Cy1 to the upper part of cylinder Cy2. Pipe PP1L allows transfer of fluid F from the lower part of cylinder Cy1 to the lower part of cylinder Cy2. The cylinder Cy1 on the left and the cylinder Cy3 on the right of the truss element T also have hydraulic couplers like HC1 and HC2.

The hydraulic couplers can be used to connect the hydraulic system of two adjacent truss elements T1 and T2 as shown on FIG. 7.

FIG. 6 therefore shows a mechanism that can be used with a tiled display comprising at least one truss, the at least one truss having at least one first and one second suspension point PUP1 and PUP2, from which display tiles can be suspended, further comprising first and second actuators Pi1 and Pi2, adapted to modify the vertical position of the at least one first or the at least one second suspension point in a vertical direction, in function of a force applied to the at least one first suspension point and a force applied to the at least one second suspension point.

FIG. 6 shows in addition that a further suspension point PUP3 and a further actuator Pi3 can be provided, i.e. that any of the embodiments of the present invention are modular in nature and hence the load levelling mechanisms of the present invention are scalable with respect to the size of the array of display tiles.

FIG. 7 shows a schematic representation of two truss elements T1 and T2 and how the information on loads applied to each truss is exchanged through pipes PPinter1 and PPinter2 and fluid F. The hydraulic couplers that are not used (on the left side of T1 and the right side of T2) are closed with hydraulics screw caps SC1, SC2, SC3 and SC4.

The invention claimed is:

1. A tiled display comprising at least a first truss and a second truss, each truss having at least one first or second suspension point, respectively, from which display tiles are able to be suspended, wherein the first and second trusses have first and second actuators, respectively, adapted to modify the position of at least one first suspension point or second suspension point relative to each of said first and second trusses, respectively, in function of a force applied to the at least one first suspension point of the first truss and a force applied to the at least one second suspension point of the second truss, wherein a sensor is provided to determine which of the force applied to the at least one first suspension point of the first truss and the force applied to the at least one second suspension point of the second truss is the largest.

2. The tiled display according to claim 1, wherein the first and second actuators further comprise features selected from:

the first actuator of the first truss and the second actuator of the second truss interacting with each other to determine which of the force applied to the at least one first suspension point of the first truss and the force applied to the at least one second suspension point of the second truss is the largest, and the first actuator having a first contact surface adapted to apply a force on a corresponding second contact surface of a second actuator of an adjacent second truss.

3. The tiled display according to claim 1, wherein the sensor is a resilient member operatively placed between the first and second actuators.

4. The tiled display according to claim 1, wherein the position of the first actuator with respect to the first truss is determined by the force applied to the at least one first suspension point of the first truss, the force applied to the first actuator by a resilient member and the force applied to the first actuator by the second actuator of the adjacent second truss.

5. The tiled display according to claim 1, wherein the position of the at least one first or second suspension point with respect to the first or second truss, respectively, is a function of the position of the first or second actuator.

6. A method of load levelling of a tiled display comprising at least a first truss and a second truss, each truss having at least one first suspension point or second suspension point, respectively, from which display tiles are able to be suspended,
wherein the first and second trusses have first and second actuators, respectively, the method comprising:
modifying the position of at least one first or second suspension point relative to each of said first and second trusses, respectively, in function of a force applied to the at least one first suspension point of the first truss and a force applied to the at least one second suspension point of the second truss; and
a determining step selected from:
determining which of the force applied to the at least one first suspension point of the first truss and the force applied to the at least one second suspension point of the second truss is the largest, and
a determining step requiring interaction between the first actuator of the first truss and the second actuator of the second truss.

7. The method according to claim 6, wherein the first actuator has a first contact surface which applies a force on a corresponding second contact surface of the second actuator of the adjacent second truss.

8. The method according to claim 6, wherein the force applied to the at least one first suspension point of the first truss, the force applied to the first actuator by a resilient member and the force applied to the first actuator by a second actuator of an adjacent second truss, determines the position of the first actuator with respect to the first truss.

9. The method according to claim 8, wherein a function of the position of the first or second actuator determines the position of the at least one first or second suspension point with respect to the first or second truss, respectively.

10. A mechanism adapted for use with a tiled display comprising:
at least one truss, the at least one truss having at least one first suspension point and one second suspension point, from which display tiles are able to be suspended,
first and second actuators adapted to modify the vertical position of the at least one first or the at least one second suspension point in a vertical direction, in function of a force applied to the at least one first suspension point and a force applied to the at least one second suspension point,
wherein the at least one truss further comprises at least a first truss and a second truss, each truss having the at least one first suspension point or second suspension point, respectively, from which display tiles can be suspended,
wherein the at least first and second trusses have the first and second actuators, respectively, adapted to modify the position of the at least one first or second suspension point relative to each of said at least first and second trusses, respectively, in function of a force applied to the at least first suspension point of the first truss and a force applied to the at least second suspension point of the second truss.

11. The mechanism according to claim 10 further comprising a sensor to determine which of the force applied to the at least first suspension point and the force applied to the at least second suspension point is the largest.

12. The mechanism according to claim 10, wherein the first actuator and the second actuator interact with each other to determine which of the force applied to the at least first suspension point and the force applied to the at least second suspension point is the largest.

13. The mechanism according to claim 10, wherein the first actuator has a first contact surface adapted to apply a force on a corresponding second contact surface of the second actuator.

14. The mechanism according to claim 10, wherein the position of the first actuator is determined by the force applied to the at least first suspension point, the force applied to the first actuator by a resilient member and the force applied to the first actuator by a second actuator.

15. The mechanism according to claim 10, wherein the position of the at least first or second suspension point is a function of the position of the first or second actuator.

16. A method of load levelling of a tiled display comprising at least one truss, the at least one truss having at least one first and one second suspension point from which display tiles are able to be suspended,
wherein the at least one truss has first and second actuators, the method comprising:
modifying the position of the at least first or the at least second suspension point in function of a force applied to the at least first suspension point and a force applied to the at least second suspension point,
wherein the first actuator has a first contact surface which applies a force on a corresponding second contact surface of a second actuator.

17. The method of claim 16, further comprising a determining step selected from:
determining which of the force applied to the at least first suspension point and the force applied to the at least second suspension point is the largest, and
a determining step requiring interaction between the first actuator and the second actuator.

18. The method according to claim 16, wherein the force applied to the at least one first suspension point, the force applied to the first actuator by a resilient member and the force applied to the first actuator by the second actuator, determines the position of the first actuator.

19. The method according to claim 16, wherein a function of the position of the first or second actuator determines the position of the at least one first or second suspension point, respectively.

* * * * *